United States Patent
Kweon

(10) Patent No.: US 12,444,471 B2
(45) Date of Patent: Oct. 14, 2025

(54) MEMORY DEVICE FOR PERFORMING ERASE VERIFY OPERATION ON CELL STRING GROUP BASIS AND METHOD OF OPERATING THE SAME

(71) Applicant: SK hynix Inc., Gyeonggi-do (KR)

(72) Inventor: Jun Young Kweon, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 228 days.

(21) Appl. No.: 18/462,433

(22) Filed: Sep. 7, 2023

(65) Prior Publication Data

US 2024/0312539 A1 Sep. 19, 2024

(30) Foreign Application Priority Data

Mar. 14, 2023 (KR) .................. 10-2023-0033192

(51) Int. Cl.
*G11C 16/04* (2006.01)
*G11C 16/34* (2006.01)

(52) U.S. Cl.
CPC ...... *G11C 16/3445* (2013.01); *G11C 16/0483* (2013.01)

(58) Field of Classification Search
CPC .................................................. G11C 16/04
See application file for complete search history.

(56) References Cited

U.S. PATENT DOCUMENTS

2018/0082731 A1* 3/2018 Lee .................... G11C 16/0483

FOREIGN PATENT DOCUMENTS

KR 10-2020-0112192 A 10/2020
KR 10-2020-0139042 A 12/2020

* cited by examiner

*Primary Examiner* — Jason Lappas
(74) *Attorney, Agent, or Firm* — IP & T GROUP LLP

(57) ABSTRACT

Provided herein may be a memory device for performing an erase verify operation on a cell string group basis, and method of operating the same. The memory device may include a plurality of memory blocks, each including a plurality of cell string groups, a peripheral circuit configured to perform an erase verify operation on a memory block selected from among the plurality of memory blocks, and an erase operation controller configured to control the peripheral circuit to perform the erase verify operation in units of cell string groups within the selected memory block. The erase operation controller controls the peripheral circuit to apply, during the erase verify operation, different erase verify voltages to the selected memory block whenever the erase verify operation is performed on each of the cell string groups.

18 Claims, 11 Drawing Sheets

| ERASE VERIFY VOLTAGE INFORMATION | | |
|---|---|---|
| Vref | Vunit | Va |

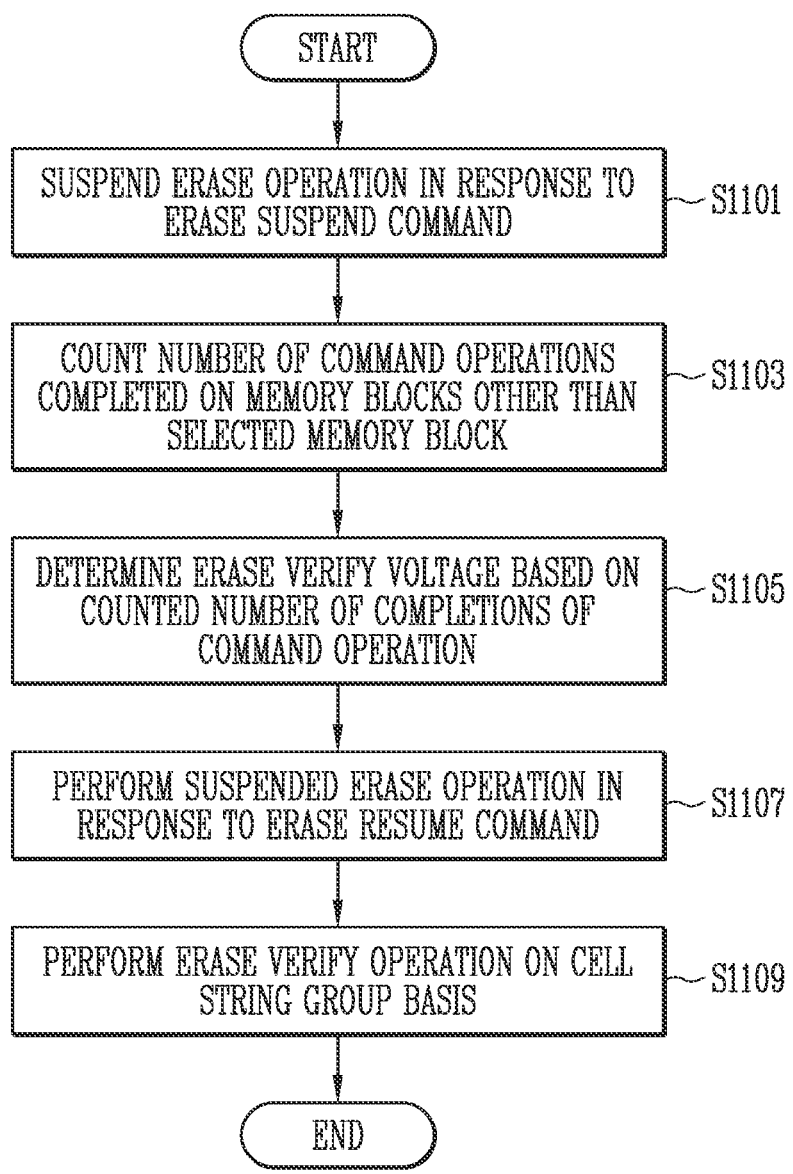

MEMORY DEVICE FOR PERFORMING ERASE VERIFY OPERATION ON CELL STRING GROUP BASIS AND METHOD OF OPERATING THE SAME

CROSS-REFERENCE TO RELATED APPLICATION

The present application claims priority under 35 U.S.C. § 119(a) to Korean patent application number 10-2023-0033192 filed on Mar. 14, 2023, the entire disclosure of which is incorporated by reference herein.

BACKGROUND

1. Field of Invention

Various embodiments of the present disclosure relate to an electronic device, and more particularly to a memory device and a method of operating the memory device.

2. Description of Related Art

A nonvolatile memory device is a memory device in which stored data is retained even when the supply of power is interrupted. Examples of the nonvolatile memory device may include a read only memory (ROM), a programmable ROM (PROM), an electrically programmable ROM (EPROM), an electrically erasable and programmable ROM (EEPROM), and a flash memory.

An erase operation may be an operation of causing threshold voltage distributions of memory cells to be in an erase state. An erase verify operation may be an operation of determining whether the threshold voltage distributions of the memory cells are in an erase state after the erase operation is performed. When an erase verify operation is performed on a cell string basis, a time difference may occur between a cell string on which an erase verify operation is first performed and a cell string on which an erase verify operation is performed last.

SUMMARY

Various embodiments of the present disclosure are directed to a memory device that is capable of performing an erase verify operation on a cell string group basis and a method of operating the memory device.

An embodiment of the present disclosure may provide for a memory device. The memory device may include a plurality of memory blocks, each including a plurality of cell string groups, a peripheral circuit configured to perform an erase verify operation on a memory block selected from among the plurality of memory blocks, and an erase operation controller configured to control the peripheral circuit to perform the erase verify operation in units of cell string groups within the selected memory block. The erase operation controller may control the peripheral circuit to apply, during the erase verify operation, different erase verify voltages to the selected memory block whenever the erase verify operation is performed each of the cell string groups.

An embodiment of the present disclosure may provide for a method of operating a memory device. The method may include suspending, in response to an erase suspend command, an erase operation being performed on a selected memory block, counting a number of command operations completed during a period from a time at which the erase suspend command is input to a time at which an erase resume command is input, determining an erase verify voltage to be applied to the selected memory block based on the counted number, and resuming the suspended erase operation in response to the erase resume command.

An embodiment of the present disclosure may provide for a method of operating a memory device. The method may include suspending and then resuming an erase operation on a first memory block. The resumed erase operation may include an operation of applying an erase verify voltage to each cell string group of a plurality of cell string groups, the erase verify voltage depending on a number of operations completed on one or more second memory blocks while the erase operation stays suspended.

An embodiment of the present disclosure may provide for a method of operating a memory device. The method may include performing an erase voltage application operation on a memory block, and performing erase verify operations on respective cell string groups within the memory block by applying erase verify voltages for the respective cell string groups, the erase verify voltages being different from each other by an integer multiple of a unit voltage.

BRIEF DESCRIPTION OF THE DRAWINGS

FIG. 4 is a diagram illustrating erase verify voltage information according to an embodiment of the present disclosure.

FIG. 11 is a flowchart illustrating the operation of a memory device according to an embodiment of the present disclosure.

DETAILED DESCRIPTION

Specific structural or functional descriptions in the embodiments of the present disclosure introduced in this specification are provided as examples to describe embodiments according to the concept of the present disclosure. The embodiments according to the concept of the present disclosure may be practiced in various forms, and should not be construed as being limited to the embodiments described in the specification.

Figure 1:
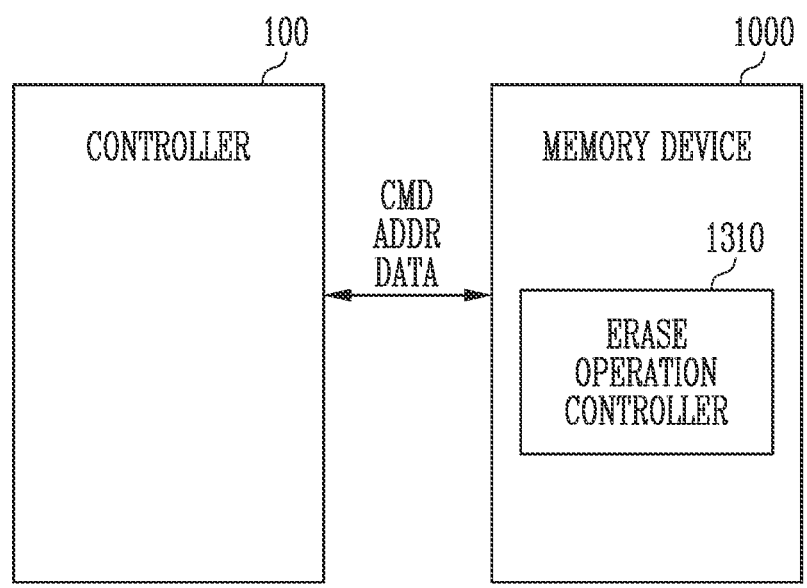
FIG. 1 is a diagram illustrating a storage device according to an embodiment of the present disclosure.

FIG. 1 is a diagram illustrating a storage device according to an embodiment of the present disclosure.

Referring to FIG. 1, the storage device may include a controller 100 and a memory device 1000.

The controller 100 may control the overall operation of the storage device.

The controller 100 may control the memory device 1000 so that a program operation, a read operation or an erase operation is performed in response to a request received from a host (not illustrated). When a program operation is performed, the controller 100 may provide a program command and data to the memory device 1000. When a read operation is performed, the controller 100 may provide a read command to the memory device 1000. When an erase operation is performed, the controller 100 may provide an erase command to the memory device 1000.

The memory device 1000 may receive a command and an address from the controller 100, and may access the area of a memory cell array, selected by the address. That is, the memory device 1000 may perform an operation corresponding to the command on the area selected by the address. For example, during the program operation, the memory device 1000 may program data to the area selected by the address. During the read operation, the memory device 1000 may read data from the area selected by the address. During the erase operation, the memory device 1000 may erase data stored in the area selected by the address.

In an embodiment, the memory device 1000 takes many alternative forms, such as a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM). In the present specification, for convenience of description, description is made on that the memory device 1000 is a NAND flash memory.

The controller 100 may provide a suspend command to the memory device 1000 in response to a request from the host (not illustrated). Further, the controller 100 may provide a resume command to the memory device 1000 in response to a request from the host (not illustrated). The suspend command may be a command requesting the memory device 1000 to suspend a command operation being performed. The resume command may be a command requesting the memory device 1000 to resume the suspended command operation.

The memory device 1000 may suspend the command operation being performed in response to the suspend command. For example, when the suspend command is input while the memory device 1000 performs an erase operation, the memory device 1000 may suspend the erase operation being performed. Furthermore, the memory device 1000 may resume the suspended command operation in response to the resume command. For example, the memory device 1000 may resume the suspended erase operation in response to the resume command.

The controller 100 may provide the suspend command to the memory device 1000, and thereafter provide an operation command to the memory device 1000. For example, the controller 100 may provide the suspend command to the memory device 1000, and may control the memory device 1000 to perform an additional command operation other than the suspended command operation. The controller 100 may provide the suspend command to the memory device 1000, and thereafter provide a read command, a program command or an erase command to the memory device 1000.

The memory device 1000 may perform a command operation in response to a command that is input between a time point at which the suspend command is input and a time point at which the resume command is input. For example, the memory device 1000 may suspend an erase operation being performed in response to the suspend command that is input while performing the erase operation on a selected memory block.

The memory device 1000 may perform a command operation on memory blocks other than the selected memory block in response to a program command, a read command, or an erase command that is input after the suspend command is input.

The memory device 1000 may include an erase operation controller 1310.

The erase operation controller 1310 may control the memory device 1000 to perform an erase operation which includes an erase verify operation as a sub operation so that data stored in the area selected by the address is erased. Details of the erase operation controller 1310 will be described below with reference to FIG. 2.

Figure 2:
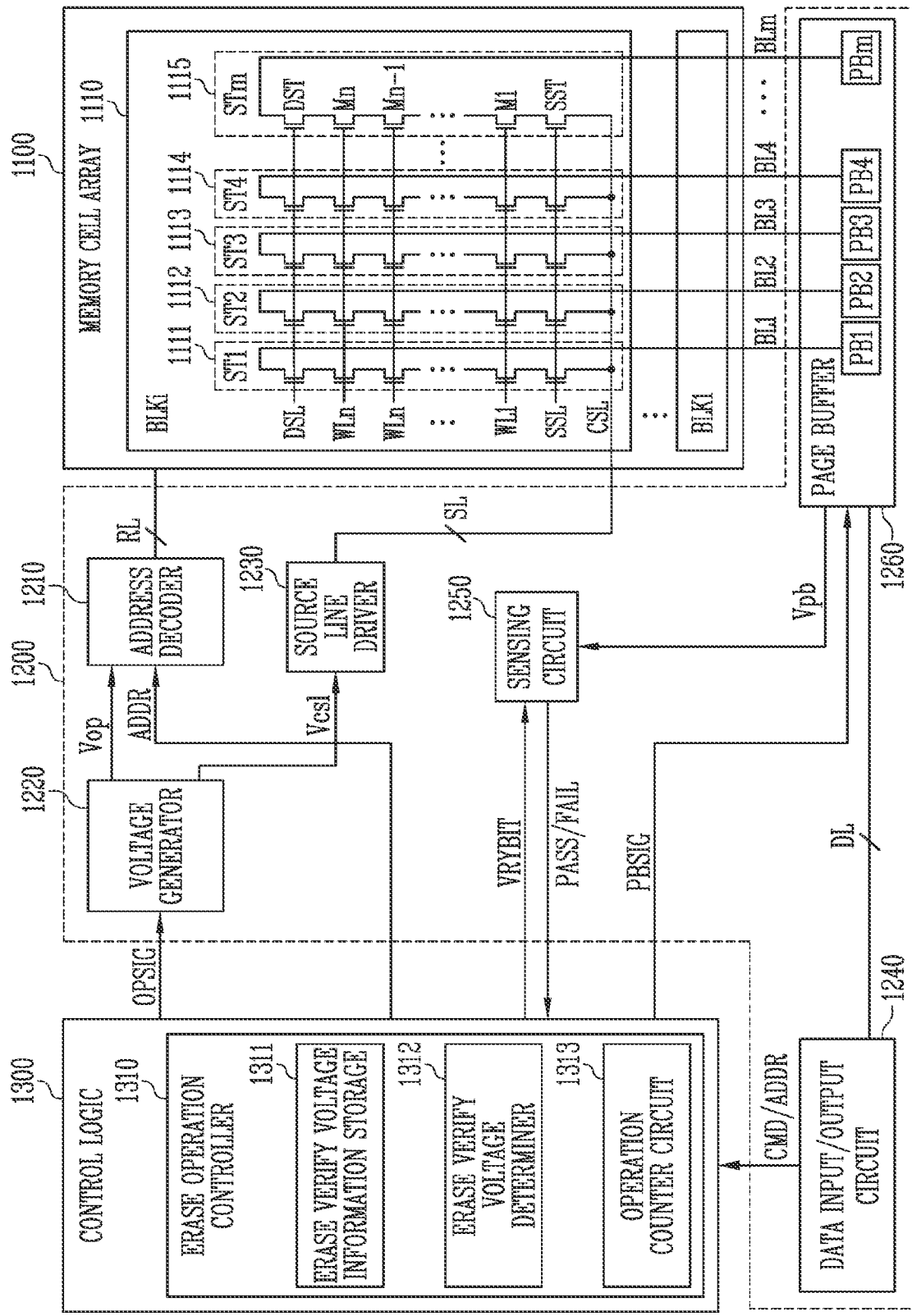
FIG. 2 is a diagram illustrating a memory device according to an embodiment of the present disclosure.

FIG. 2 is a diagram illustrating a memory device according to an embodiment of the present disclosure.

Referring to FIG. 2, the memory device 1000 may include a memory cell array 1100, a peripheral circuit 1200, and a control logic 1300.

The memory cell array 1100 may include a plurality of memory blocks BLK1 to BLKi. The plurality of memory blocks BLK1 to BLKi may be coupled to an address decoder 1210 through row lines RL. The plurality of memory blocks BLK1 to BLKi may be coupled to a page buffer 1260 through bit lines BL1 to BLm. Each of the memory blocks BLK1 to BLKi may include a plurality of memory cells.

The memory block BLKi 1110 may include a plurality of word lines coupled in parallel to each other between a first select line and a second select line. Here, the first select line may be a source select line SSL, and the second select line may be a drain select line DSL. More specifically, the memory block 1110 may include a plurality of cell strings coupled between the bit lines BL1 to BLm and a common source line CSL. The bit lines BL1 to BLm may be coupled to the plurality of cell strings, respectively, and the common source line CSL may be coupled in common to the plurality of cell strings.

The memory block 1110 may include a plurality of cell string groups 1111, 1112, 1113, 1114, and 1115. Each of the cell string groups may include one or more cell strings. In an example, the first cell string group 1111 may include one cell string. In an example, although not illustrated in FIG. 1, the first cell string group 1111 may include two or more cell strings. For convenience of description, although each of the cell string groups 1111, 1112, 1113, 1114, and 1115 is illustrated as including one cell string in FIG. 2, the present disclosure is not limited to this embodiment.

Because the plurality of cell strings may have the same configuration, the cell string ST1 coupled to the first bit line BL1 is described in detail by way of example. The cell string ST1 may include a source select transistor SST, a plurality of memory cells M1 to Mn, and a drain select transistor DST which are coupled in series to each other between the common source line CSL and the first bit line BL1. The cell string ST1 may include at least one source select transistor SST and at least one drain select transistor DST, and may include more memory cells M1 to Mn than the memory cells illustrated in FIG. 2.

A source of the source select transistor SST may be coupled to the common source line CSL, and a drain of the drain select transistor DST may be coupled to the first bit line BL1. The memory cells M1 to Mn may be coupled in series between the source select transistor SST and the drain select transistor DST. Gates of the source select transistors SST included in different cell strings may be coupled to the source select line SSL, gates of the drain select transistors DST included in different cell strings ST may be coupled to the drain select line DSL, and gates of the memory cells M1 to Mn may be coupled to a plurality of word lines WL1 to WLn, respectively. A group of memory cells coupled to the same word line, among the memory cells included in different cell strings ST, may be referred to as a "physical page: PPG." Therefore, the memory block 1110 may include a number of physical pages PPG identical to the number of word lines WL1 to WLn.

Each of the memory cells included in the memory block 1110 may be implemented as a single-level cell (SLC) capable of storing one bit of data, a multi-level cell (MLC) capable of storing two bits of data, a triple-level cell (TLC) capable of storing three bits of data, a quad-level cell (QLC) capable of storing four bits of data, or a memory cell capable of storing five or more bits of data.

The peripheral circuit 1200 may drive the memory cell array 1100. In an example, the peripheral circuit 1200 may drive the memory cell array 1100 to perform a program operation, a read operation, or an erase operation under the control of the control logic 1300. In an example, the peripheral circuit 1200 may apply various operating voltages required for an internal operation to the row lines RL and the bit lines BL1 to BLm or discharge the applied voltages, under the control of the control logic 1300.

The peripheral circuit 1200 may include the address decoder 1210, a voltage generator 1220, a source line driver 1230, a data input/output circuit 1240, a sensing circuit 1250, and the page buffer 1260.

The address decoder 1210 may be coupled to the memory cell array 1100 through the row lines RL. The row lines RL may include drain select lines, word lines, source selection lines, and the common source line.

The address decoder 1210 may be operated in response to the control of the control logic 1300. The address decoder 1210 may receive addresses ADDR from the control logic 1300.

The address decoder 1210 may decode a block address, among the received addresses ADDR. The address decoder 1210 may select at least one of the memory blocks BLK1 to BLKi according to the decoded block address. The address decoder 1210 may decode a row address, among the received addresses ADDR. The address decoder 1210 may select at least one word line WL of a selected memory block by applying voltages supplied from the voltage generator 1220 to the at least one word line WL according to the decoded row address.

During a read operation, the address decoder 1210 may apply a read voltage to a selected word line and apply a pass voltage higher than the read voltage to unselected word lines.

During a program operation, the address decoder 1210 may apply a program voltage to the selected word line and apply a pass voltage having a level lower than that of the program voltage to unselected word lines. During a program verify operation, the address decoder 1210 may apply a verify voltage to the selected word line and apply a pass voltage having a level higher than that of the verify voltage to the unselected word lines.

The erase operation may be performed on a memory block basis. During the erase operation, the addresses ADDR may include a block address. The address decoder 1210 may decode the block address and select one memory block according to the decoded block address. During the erase operation, the address decoder 1210 may apply a ground voltage to word lines coupled to the selected memory block.

The address decoder 1210 may decode a column address among the received addresses ADDR. The decoded column address may be provided to the page buffer 1260.

The voltage generator 1220 may generate a plurality of operating voltages Vop using an external supply voltage that is supplied to the memory device 1000. The voltage generator 1220 may be operated under the control of the control logic 1300. For example, the voltage generator 1220 may generate various operating voltages Vop that are used for program, read, and erase operations in response to an operation signal OPSIG provided from the control logic 1300. The voltage generator 1220 may generate a plurality of program voltages, a plurality of pass voltages, a plurality of select read voltages, a plurality of unselect read voltages, and a plurality of erase voltages.

In an embodiment, the voltage generator 1220 may generate a common source line voltage Vcsl to be provided to the common source line CSL in response to the operating signal OPSIG. In an embodiment, the common source line voltage Vcsl may be a supply voltage. The voltage generator 1220 may provide the common source line voltage Vcsl to the source line driver 1230. The common source line voltage Vcsl may be provided to the common source line CSL through the source line driver 1230.

The generated operating voltages Vop may be supplied to the memory cell array 1100 through the address decoder 1210.

The page buffer 1260 may include first to m-th page buffers PB1 to PBm. The first to m-th page buffers PB1 to PBm may be coupled to the memory cell array 1100 through the first to m-th bit lines BL1 to BLm, respectively. The first to m-th page buffers PB1 to PBm may be operated under the control of the control logic 1300.

The data input/output circuit 1240 may be coupled to the page buffer 1260 through the data lines DL. The data input/output circuit 1240 is operated under the control of the control logic 1300.

During a verify operation, the sensing circuit 1250 may generate a reference current in response to an enable bit signal VRYBIT generated by the control logic 1300, and may output a pass signal PASS or a fail signal FAIL to the control logic 1300 by comparing a sensing voltage Vpb received from the page buffer 1260 with a reference voltage generated by the reference current. In an example, the sensing circuit 1250 may output the pass signal PASS to the control logic 1300 when the magnitude of the sensing voltage Vpb is greater than that of the reference voltage. In an example, the sensing circuit 1250 may output the fail signal FAIL to the control logic 1300 when the magnitude of the sensing voltage Vpb is less than that of the reference voltage.

The control logic 1300 may be coupled to the address decoder 1210, the voltage generator 1220, the data input/output circuit 1240, the sensing circuit 1250, and the page buffer 1260. The control logic 1300 may control the overall operation of the memory device 1000. The control logic 1300 may be operated in response to a command CMD provided from the controller 100 illustrated in FIG. 1.

The control logic 1300 may control the peripheral circuit 1200 by generating various types of signals in response to the command CMD and an address ADDR. For example, the control logic 1300 may generate the operation signal OPSIG, the addresses ADDR, a page buffer control signal PBSIG, and the enable bit signal VRYBIT in response to the command CMD and the address ADDR. The control logic 1300 may output the operation signal OPSIG to the voltage generator 1220, may output the addresses ADDR to the address decoder 1210, may output the page buffer control signal PBSIG to the page buffer 1260, and may output the enable bit signal VRYBIT to the sensing circuit 1250. In addition, the control logic 1300 may determine whether a verify operation has passed or failed in response to the pass or fail signal PASS or FAIL output from the sensing circuit 1250.

The control logic 1300 may include the erase operation controller 1310.

The erase operation controller 1310 may control the overall erase operation on a selected memory block. The erase operation controller 1310 may generate the operation signal OPSIG for erasing data stored in a selected memory block. The erase operation controller 1310 may control the peripheral circuit 1200 to perform an erase loop including an erase voltage application operation of applying an erase voltage for erasing data stored in the selected memory block and an erase verify operation of verifying whether all data stored in the selected memory block is erased.

The erase operation controller 1310 may control the peripheral circuit 1200 to suspend the erase loop being performed in response a suspend command provided from the controller 100 illustrated in FIG. 1. Also, the erase operation controller 1310 may control the peripheral circuit 1200 to resume the suspended erase loop in response a resume command provided from the controller 100 illustrated in FIG. 1.

During the erase voltage application operation, the erase operation controller 1310 may control the peripheral circuit 1200 to apply a ground voltage to all word lines included in the selected memory block. Further, during the erase voltage application operation, the erase operation controller 1310 may control the peripheral circuit 1200 to apply the erase voltage to a channel region of memory cells in the selected memory block.

During the erase verify operation, the erase operation controller 1310 may control the peripheral circuit 1200 to apply an erase verify voltage to all word lines included in the selected memory block. The erase operation controller 1310 may apply the erase verify voltage to all word lines included in the selected memory block, and may check the threshold voltages of memory cells by sensing currents or voltages flowing through the bit lines BL1 to BLm. When the number of memory cells determined to be on-cells is equal to or greater than a reference value after the erase verify voltage is applied, the erase operation controller 1310 may determine that the erase verify operation has passed. Further, when the number of memory cells determined to be on-cells is less than the reference value after the erase verify voltage is applied, the erase operation controller 1310 may determine that the erase verify operation has failed.

In an embodiment, the erase operation controller 1310 may control the peripheral circuit 1200 to perform an erase verify operation on each cell string group included in the selected memory block 1110. Because each of the plurality of cell string groups 1111, 1112, 1113, 1114, and 1115 may include at least one cell string, the erase verify operation may be performed on a cell string basis.

In an embodiment, the erase operation controller 1310 may control the peripheral circuit 1200 to apply, during the erase verify operation, different erase verify voltages for respective cell string groups within a selected memory block so as to perform the erase verify operation in units of the cell string groups within the selected memory block. Whenever the erase verify operation is performed on each of the cell string groups, erase verify voltages applied to word lines may be different from each other. For example, the erase verify voltage applied to the word lines WL1 to WLn during an erase verify operation performed on the first cell string group 1111 may be different from the erase verify voltage applied to the word lines WL1 to WLn during an erase verify operation performed on the second cell string group 1112. Similarly, the erase verify voltage applied to the word lines WL1 to WLn during an erase verify operation performed on the second cell string group 1112 may be different from the erase verify voltage applied to the word lines WL1 to WLn during an erase verify operation performed on the third cell string group 1113.

The erase operation controller 1310 may include an erase verify voltage information storage 1311 and an erase verify voltage determiner 1312 for determining the different erase verify voltages.

The erase verify voltage information storage 1311 may store information required to determine erase verify voltages. The information required to determine the erase verify voltages may include information of a reference erase verify voltage, a unit voltage, and a reference offset voltage. Details of the erase verify voltage information storage 1311 will be described later.

The erase verify voltage determiner 1312 may determine the erase verify voltages to be applied to the word lines WL1 to WLn coupled to the selected memory block 1110 based on the information stored in the erase verify voltage information storage 1311.

In an embodiment, the erase verify voltage determiner 1312 may generate, based on the information required to determine the erase verify voltages, an erase verify voltage table including information of the levels of the erase verify voltages to be applied to the respective cell string groups in the erase verify operation. The erase operation controller 1310 may control the peripheral circuit 1200 to apply, for the respective cell string groups within the selected memory block 1110, the different erase verify voltages to the selected memory block 1110 based on the erase verify voltage table.

The erase operation controller 1310 may further include an operation counter circuit 1313.

The operation counter circuit 1313 may count the number of completed command operations while the erase operation stays suspended. The command operation may include a program operation, a read operation, or an erase operation.

In an embodiment, the operation counter circuit 1313 may count the number of command operations completed during a period from a time point at which the erase loop on the selected memory block 1110 is suspended to a time point at which the erase loop on the selected memory block 1110 is resumed. The operation counter circuit 1313 may count the number of command operations completed on memory blocks other than the selected memory block 1110, among the plurality of memory blocks BLK1 to BLKi.

In an embodiment, the erase verify voltage determiner 1312 may determine the erase verify voltages to be applied based on the number of completed command operations. The operation of the erase verify voltage determiner 1312 will be described later.

Figure 3:
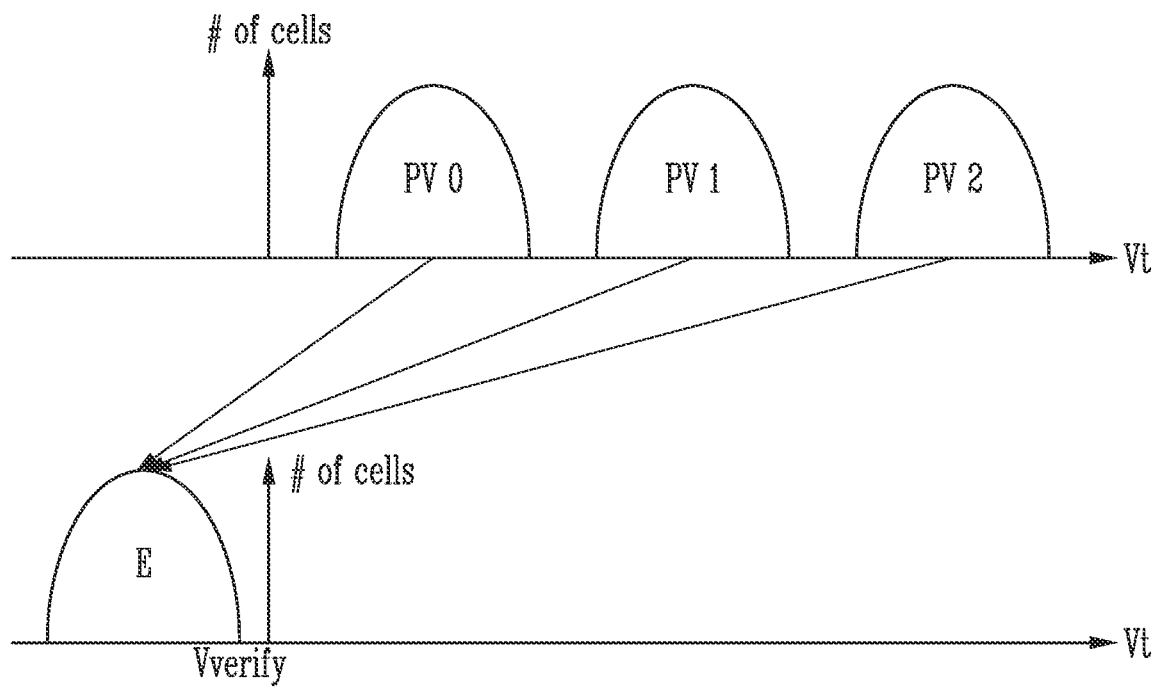
FIG. 3 is a diagram illustrating threshold voltage distributions of memory cells in an erase state.

FIG. 3 is a diagram illustrating threshold voltage distributions of memory cells in an erase state.

Referring to FIG. 3, the horizontal axis denotes a threshold voltage (Vth), and the vertical axis indicates the number of memory cells (# of cells).

For convenience of description, each memory cell is a multi-level cell (MLC) in which one memory cell stores two data bits.

Each of the memory cells may have four states depending on threshold voltage distributions. Each of the memory cells may have a threshold voltage corresponding to one of a plurality of program states. For example, the plurality of program states may indicate 0-th to second program states.

In an embodiment, the threshold voltage of each memory cell may be one of an erase state E, the 0-th program state PV0, the first program state PV1, and the second program state PV2.

During an erase operation, the memory cells may be erased to have a threshold voltage distribution corresponding to the erase state E. During the erase operation on the selected memory block, all memory cells included in the selected memory block may be erased to have a threshold voltage distribution corresponding to the erase state E.

Whether the memory cells have a threshold voltage distribution corresponding to the erase state E may be verified through an erase verify operation. Among memory cells read by applying an erase verify voltage Vverify, memory cells having threshold voltages lower than the erase verify voltage Vverify may be read as on-cells. Memory cells read as on-cells may pass the erase verify operation. On the other hand, among the memory cells read by applying the erase verify voltage Vverify, memory cells having threshold voltages higher than the erase verify voltage Vverify may be read as off-cells. The memory cells read as the off-cells may fail the erase verify operation.

FIG. 4 is a diagram illustrating erase verify voltage information according to an embodiment of the present disclosure.

The erase verify voltage information storage 1311 may store information required to determine erase verify voltages. The information required to determine the erase verify voltages may include information of a reference erase verify voltage Vref, a preset unit voltage Vunit, and a reference offset voltage Va.

The reference erase verify voltage Vref may be a voltage having the same level as the verify voltage Vverify illustrated in FIG. 3. A memory cell having a threshold voltage lower than the reference erase verify voltage Vref may be a cell having passed the erase verify operation. Similarly, a memory cell having a threshold voltage higher than the reference erase verify voltage Vref may be a cell having failed the erase verify operation.

In an embodiment, the reference erase verify voltage Vref may be a voltage applied to the selected memory block 1110 when the erase verify operation is performed on the first cell string group 1111 illustrated in FIG. 2. When the erase verify operation is performed on the selected memory block 1110, the first cell string group 1111 may be a group on which the erase verify operation is first performed.

The unit voltage Vunit may be the unit for determining an erase verify voltage increased or decreased from the reference erase verify voltage Vref. For example, when the erase verify operation is performed by applying the reference erase verify voltage Vref to the first cell string group 1111, a voltage increased or decreased from the reference erase verify voltage Vref by the unit voltage Vunit may be applied as the erase verify voltage in the erase verify operation secondly performed on the second cell string group 1112 illustrated in FIG. 2.

The offset voltage Voff (see FIG. 10) may be increased in proportion to the number of command operations completed while the erase loop is suspended. The offset voltage Voff may be determined by multiplying the reference offset voltage Va by the number of command operations that are performed. The reference offset voltage Va may be determined based on the time required to perform a read operation, a program operation, and an erase operation, the number of program loops, the number of erase loops, or the like.

In an embodiment, when the number of command operations completed during a period from the suspension of the erase loop on the selected memory block to the resumption of the erase loop is 3, the offset voltage Voff may be determined to be 3*reference offset voltage Va.

Figure 5:
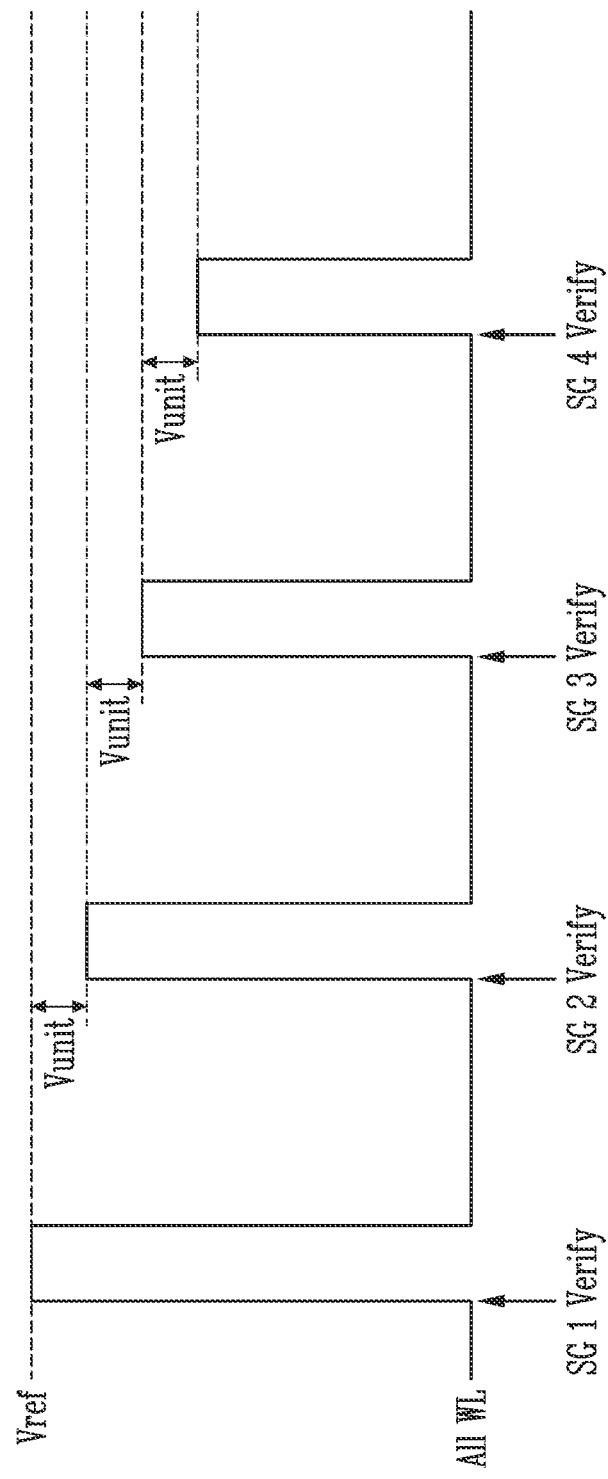
FIG. 5 is a diagram illustrating different erase verify voltages that are applied according to an embodiment of the present disclosure.

FIG. 5 is a diagram illustrating different erase verify voltages that are applied according to an embodiment of the present disclosure.

Referring to FIG. 5, erase verify voltages applied during erase verify operations on respective cell string groups may be different from each other.

The erase verify voltage applied to a selected memory block while an erase verify operation is performed on each cell string group may be decreased by the unit voltage Vunit.

The erase verify voltage applied when the erase verify operation is first performed on a first cell string group SG1 may be the reference erase verify voltage Vref.

The erase verify voltage determiner may determine the erase verify voltage to be applied when the erase verify operation is performed on a second cell string group SG2 that is a cell string group next to the first cell string group SG1. In an embodiment, the erase verify voltage for the second cell string group SG2 may be a voltage Vref-Vunit decreased from the reference erase verify voltage Vref by the unit voltage Vunit.

The erase verify voltage determiner may determine the erase verify voltage to be applied when the erase verify operation is performed on a third cell string group SG3 that is a cell string group next to the second cell string group SG2. In an embodiment, the erase verify voltage for the third cell string group SG3 may be a voltage Vref−2*Vunit decreased from the erase verify voltage Vref-Vunit for the second cell string group SG2 by the unit voltage Vunit.

The erase verify voltage determiner may determine the erase verify voltage to be applied when the erase verify operation is performed on a fourth cell string group SG4 that is a cell string group next to the third cell string group SG3. In an embodiment, the erase verify voltage for the fourth cell string group SG4 may be a voltage Vref−3*Vunit decreased from the erase verify voltage Vref−2*Vunit for the third cell string group SG3 by the unit voltage Vunit.

The erase verify voltage determiner may generate an erase verify voltage table.

In an embodiment, the erase verify voltage determiner may generate, as a lookup table, erase verify voltages to be applied to the selected memory block based on the information required to determine the erase verify voltages, the information being stored in the erase verify voltage information storage 1311. However, the present disclosure is not limited to this embodiment, and erase verify voltages to be applied to respective cell string groups may be stored in advance in the format of the lookup table.

Figure 6:
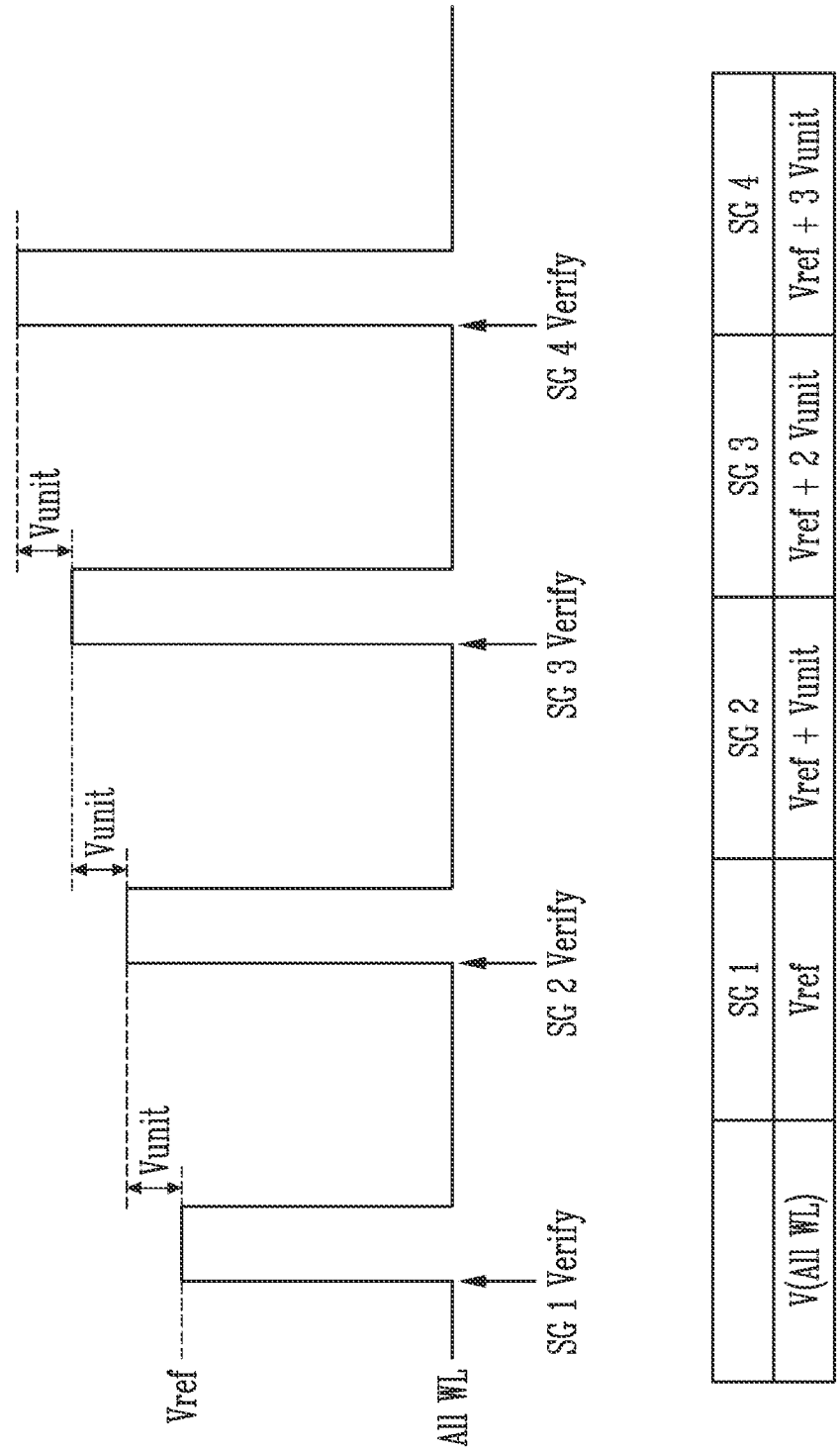
FIG. 6 is a diagram illustrating different erase verify voltages that are applied according to an embodiment of the present disclosure.

FIG. 6 is a diagram illustrating different erase verify voltages that are applied according to an embodiment of the present disclosure.

Referring to FIG. 6, erase verify voltages applied during erase verify operations on respective cell string groups may be different from each other.

The erase verify voltage applied to the selected memory block while the erase verify operation is performed on each cell string group may be increased by the unit voltage Vunit.

The erase verify voltage, applied when the erase verify operation is performed on a first cell string group SG1 on which the erase verify operation is first performed, may be the reference erase verify voltage Vref.

The erase verify voltage determiner may determine the erase verify voltage to be applied when the erase verify operation is performed on a second cell string group SG2 that is a cell string group next to the first cell string group SG1. In an embodiment, the erase verify voltage for the second cell string group SG2 may be a voltage Vref+Vunit increased from the reference erase verify voltage Vref by the unit voltage Vunit.

The erase verify voltage determiner may determine the erase verify voltage to be applied when the erase verify operation is performed on a third cell string group SG3 that is a cell string group next to the second cell string group SG2. In an embodiment, the erase verify voltage for the third cell string group SG3 may be a voltage Vref+2*Vunit increased from the erase verify voltage Vref+Vunit for the second cell string group SG2 by the unit voltage Vunit.

The erase verify voltage determiner may determine the erase verify voltage to be applied when the erase verify operation is performed on a fourth cell string group SG4 that is a cell string group next to the third cell string group SG3. In an embodiment, the erase verify voltage for the fourth cell string group SG4 may be a voltage Vref+3*Vunit increased from the erase verify voltage Vref+2*Vunit for the third cell string group SG3 by the unit voltage Vunit.

The erase verify voltage determiner may generate an erase verify voltage table.

In an embodiment, the erase verify voltage determiner may generate, as a lookup table, erase verify voltages to be applied to the selected memory block based on the information required to determine the erase verify voltages, the information being stored in the erase verify voltage information storage 1311.

Figure 7:
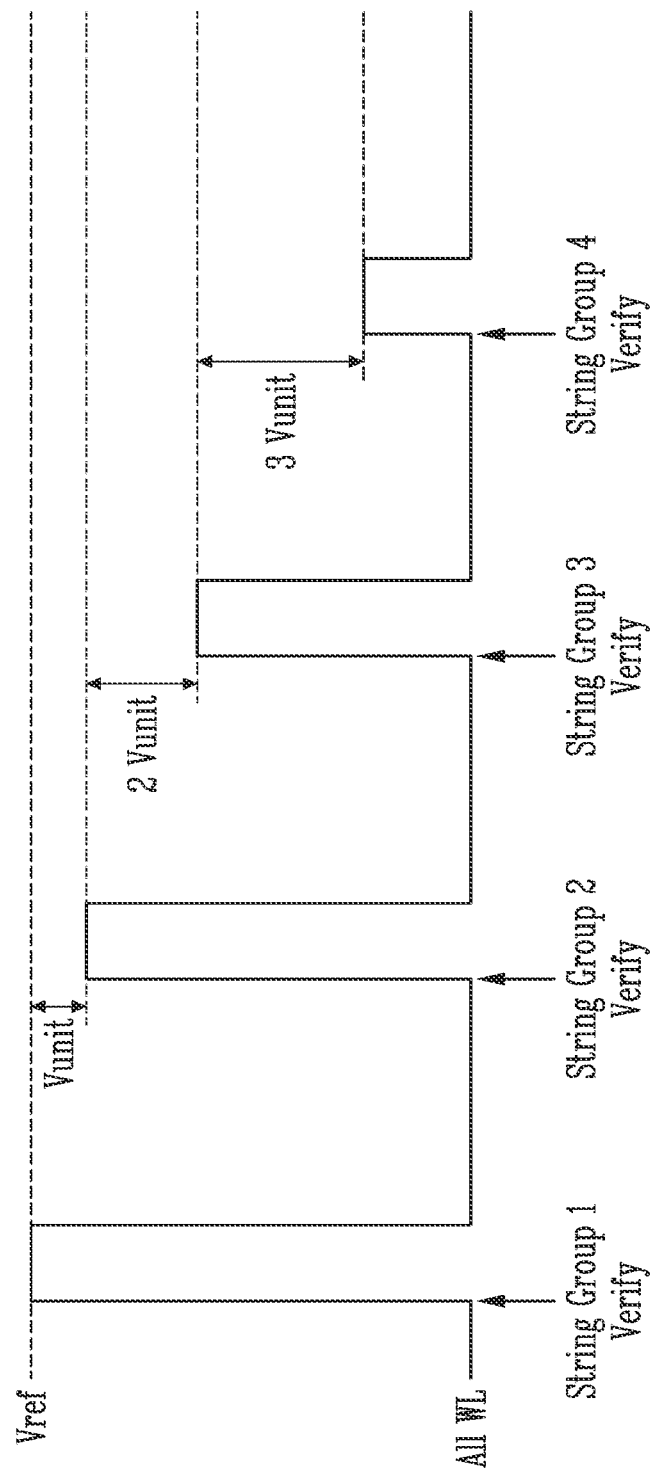
FIG. 7 is a diagram illustrating different erase verify voltages that are applied according to an embodiment of the present disclosure.

FIG. 7 is a diagram illustrating different erase verify voltages that are applied according to an embodiment of the present disclosure.

Referring to FIG. 7, erase verify voltages applied during erase verify operations on respective cell string groups may be different from each other.

The erase verify voltage applied to the selected memory block while the erase verify operation is performed on each cell string group may be decreased by an integer multiple of the unit voltage Vunit.

The erase verify voltage, applied when the erase verify operation is performed on a first cell string group SG1 on which the erase verify operation is first performed, may be a reference erase verify voltage Vref.

The erase verify voltage determiner may determine the erase verify voltage to be applied when the erase verify operation is performed on a second cell string group SG2 that is a cell string group next to the first cell string group SG1. In an embodiment, the erase verify voltage for the second cell string group SG2 may be a voltage Vref-Vunit decreased from the reference erase verify voltage Vref by the unit voltage Vunit.

The erase verify voltage determiner may determine the erase verify voltage to be applied when the erase verify operation is performed on a third cell string group SG3 that is a cell string group next to the second cell string group SG2. In an embodiment, the erase verify voltage for the third cell string group SG3 may be a voltage Vref-3*Vunit decreased from the erase verify voltage Vref-Vunit for the second cell string group SG2 by twice the unit voltage Vunit.

The erase verify voltage determiner may determine the erase verify voltage to be applied when the erase verify operation is performed on a fourth cell string group SG4 that is a cell string group next to the third cell string group SG3. In an embodiment, the erase verify voltage for the fourth cell string group SG4 may be a voltage Vref-6*Vunit decreased from the erase verify voltage Vref-3*Vunit for the third cell string group SG3 by three times the unit voltage Vunit.

The erase verify voltage determiner may generate an erase verify voltage table.

In an embodiment, the erase verify voltage determiner may generate, as a lookup table, erase verify voltages to be applied to the selected memory block based on the information required to determine the erase verify voltages, the information being stored in the erase verify voltage information storage 1311.

Figure 8:
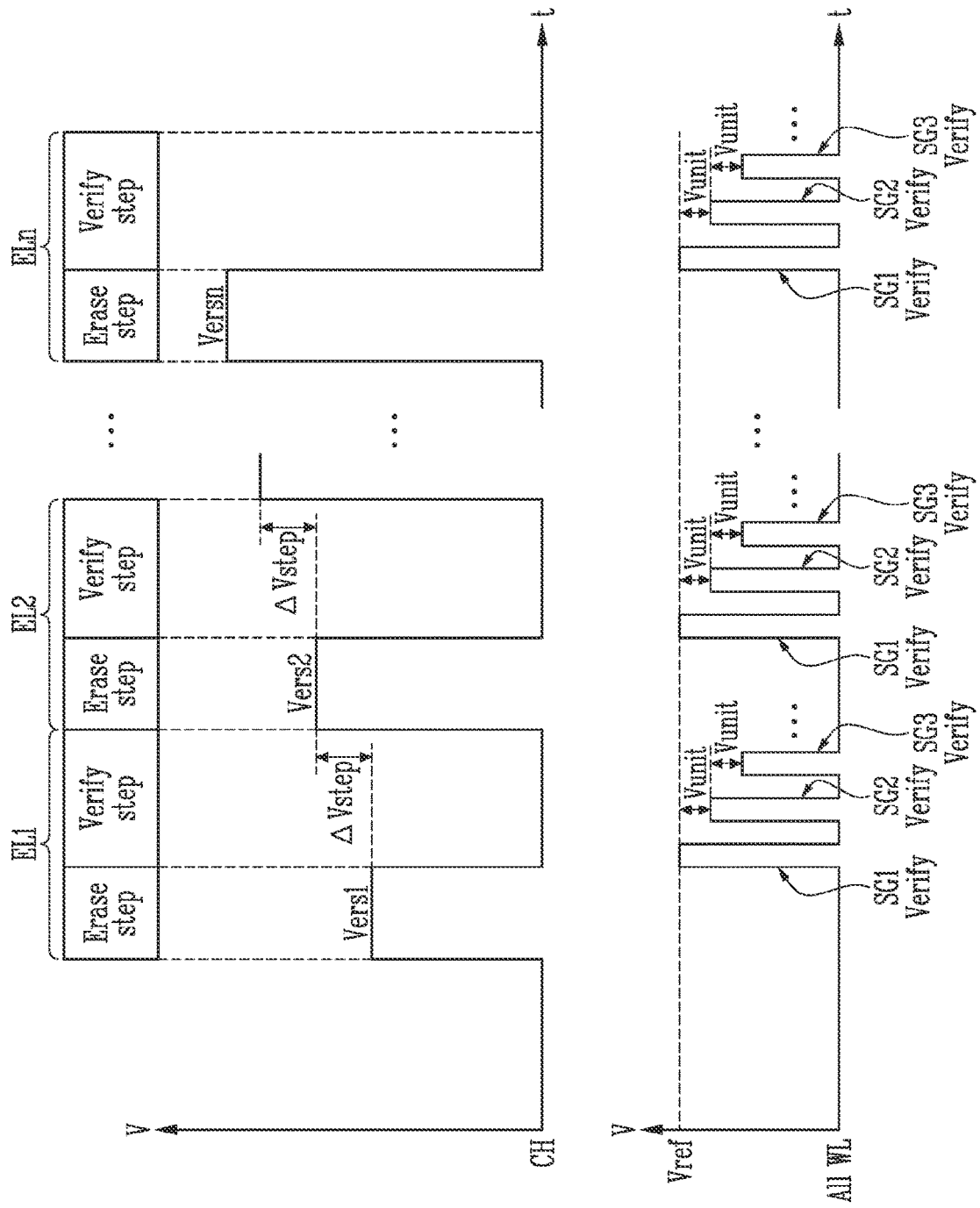
FIG. 8 is a diagram illustrating erase loops that are performed according to an embodiment of the present disclosure.

FIG. 8 is a diagram illustrating erase loops that are performed according to an embodiment of the present disclosure.

Referring to FIG. 8, the horizontal axis of each graph indicates time t, and the vertical axis thereof indicates the voltage V applied to word lines. The voltage V applied to the word line may include an erase voltage Vers and a plurality of erase verify voltages.

Referring to FIG. 8, the memory device may perform an erase operation. The erase operation may include a plurality of erase loops EL1 to ELn. The memory device may perform a plurality of erase loops EL1 to ELn so that each of memory cells included in a selected memory block has a threshold voltage distribution corresponding to an erase state.

Each of the plurality of erase loops EL1 to ELn may include an erase voltage application operation (Erase Step) and an erase verify operation (Verify Step).

The erase voltage application operation (Erase step) may be an operation of applying a ground voltage to the word line and applying the erase voltage Vers to a channel region so that memory cells included in the selected memory block have a threshold voltage distribution corresponding to the erase state. The erase voltage application operation (Erase step) may be an operation of decreasing the threshold voltages of memory cells in a program state.

The erase verify operation (Verify step) may be an operation of applying an erase verify voltage to the word line coupled to the selected memory block. The erase verify operation (Verify step) may be an operation of identifying threshold voltage distributions of memory cells erased and decreased through the erase voltage application operation (Erase step). In detail, the erase verify operation (Verify step) may be an operation of sensing data through a bit line coupled to the memory cells when the erase verify voltage is applied to the word line. During the erase verify operation (Verify step), when the threshold voltage of each of the memory cells is higher than the erase verify voltage, data corresponding to an off-cell may be sensed. During the erase verify operation (Verify step), when the threshold voltage of each of the memory cells is lower than the erase verify voltage, data corresponding to an on-cell may be sensed.

In an embodiment, the erase verify voltages applied to the word line of the selected memory block are the erase verify voltages described with reference to FIG. 5.

The memory device may perform a pass/fail check operation (P/F check) in parallel with the erase voltage application operation (Erase step) while performing the erase voltage application operation (Erase step). The pass/fail check operation (P/F check) may be an operation of determining the result of the erase verify operation based on the data sensed by the erase verify operation. The pass/fail check operation (P/F check) may be an operation of determining whether the result of the erase verify operation on each memory cell indicates a pass or fail.

In the first erase loop EL1, the memory device may apply a first erase voltage Vers1 to the channel region and thereafter apply the erase verify voltage to word lines. In an embodiment, the erase verify operation may be performed in units of the cell string groups within the selected memory block. Each of the cell string groups may include one or more cell strings. In erase verify operations on respective cell string groups, erase verify voltages applied to word lines may be different from each other. In the first erase loop EL1, the memory device may identify the threshold voltages of memory cells included in respective cell string groups by performing erase verify operations on the respective cell string groups.

In an embodiment, the memory device may apply a first erase verify voltage to the word lines so as to perform the erase verify operation on the first cell string group. The first erase verify voltage may be the reference erase verify voltage Vref illustrated in FIG. 3. The memory device may identify the threshold voltages of memory cells included in the first cell string group by applying the first erase verify voltage Vref and may determine whether the result of the erase verify operation indicates a pass or fail.

In an embodiment, the memory device may apply a second erase verify voltage to the word lines so as to perform the erase verify operation on a second cell string group that is a group next to the first cell string group. The second erase verify voltage may be a voltage Vref-Vunit decreased from the first erase verify voltage Vref by a unit voltage Vunit. The memory device may identify the threshold voltages of memory cells included in the second cell string group by applying the second erase verify voltage Vref-Vunit and may determine whether the result of the erase verify operation indicates a pass or fail.

In an embodiment, the memory device may apply a third erase verify voltage to the word lines so as to perform the erase verify operation on a third cell string group that is a group next to the second cell string group. The third erase verify voltage may be a voltage Vref−2*Vunit decreased from the second erase verify voltage Vref-Vunit by a unit voltage Vunit. The memory device may identify the threshold voltages of memory cells included in the third cell string group by applying the third erase verify voltage Vref−2*Vunit and may determine whether the result of the erase verify operation indicates a pass or fail.

In an embodiment, the memory device may perform the corresponding erase verify operation by applying a voltage, decreased from the erase verify voltage applied in the erase verify operation performed on the previous cell string group by the unit voltage Vunit, to the word lines. The erase verify operation may be performed on all cell string groups within the selected memory block.

In an embodiment, when the pass/fail check operation (P/F check) on each cell string group has failed, it may be determined that the memory cells included in the selected memory block do not have a threshold voltage distribution corresponding to the erase state E. The memory device may apply a second erase voltage Vers2 increased from the first erase voltage Vers1 by a step voltage ΔVstep to the channel region.

In the second erase loop EL2, the memory device may apply the second erase voltage Vers2 to the channel region and thereafter apply the erase verify voltage to the word lines. Similarly, the erase verify operation may be performed in units of the cell string groups within the selected memory block. In the second erase loop EL2, the memory device may identify the threshold voltages of memory cells included in the cell string groups that have failed erase verification in the first erase loop EL1, by performing the erase verify operation on the cell string groups having failed erase verification in the first erase loop EL1.

In an embodiment, the memory device may apply the erase verify voltage to the word lines so that the erase verify operation is performed in an order from the first cell string group, which is the same as the first erase loop EL1. The erase verify voltage applied to the word lines so as to perform the erase verify operation in the second erase loop EL2 may be identical to the erase verify voltage applied to the word lines so as to perform the erase verify operation in the first erase loop EL1. Similarly, the memory device may perform the erase verify operation on all cell string groups included in the selected memory block.

In an embodiment, when the pass/fail check operation (P/F check) on each cell string group has failed, it may be determined that the memory cells included in the selected memory block do not have a threshold voltage distribution corresponding to the erase state E. The memory device may repeatedly perform the erase loop until the threshold voltage distributions of memory cells included in the selected memory block become a threshold voltage distribution corresponding to the erase state E.

In the n-th erase loop ELn, the memory device may apply an n-th erase voltage Versn to the channel region and thereafter apply the erase verify voltage to the word lines. Similarly, the erase verify operation may be performed in units of the cell string groups within the selected memory block. In the n-th erase loop ELn, the memory device may identify the threshold voltages of memory cells included in the cell string groups that have failed erase verification in the n−1-th erase loop ELn−1, by performing the erase verify operation on the cell string groups having failed erase verification in the n−1-th erase loop ELn−1.

In an embodiment, the memory device may apply the erase verify voltage to the word lines so that the erase verify operation is performed in an order from the first cell string group, which is the same as the first erase loop EL1. The erase verify voltage applied to the word lines so as to perform the erase verify operation in the n-th erase loop ELn may be identical to the erase verify voltage applied to the word lines so as to perform the erase verify operation in the first erase loop EL1. Similarly, the memory device may perform the erase verify operation on all cell string groups included in the selected memory block.

In an embodiment, when the pass/fail check operation (P/F check) on each cell string group has passed, it may be determined that the memory cells included in the selected memory block have the threshold voltage distribution corresponding to the erase state E.

In an embodiment, an additional erase verify operation on a cell string group having passed the erase verify operation may be skipped. For example, when the erase verify operation on the first cell string group has passed in the erase verify operation (Verify step) of the first erase loop EL1, the erase verify operation on the first cell string group may be skipped in the second erase loop EL2. In this case, the voltage applied first to the word lines in the erase verify operation (Verify step) of the second erase loop EL2 may be the second erase verify voltage Vref-Vunit.

In an embodiment, the erase voltage Vers may be determined based on an incremental step pulse programming (ISPP) scheme. The magnitude of the erase voltage Vers may be stepwise increased or decreased as the plurality of erase loops EL1 to ELn are repeated. The number of applications of the erase voltage Vers used in each erase loop, the voltage level of the erase voltage Vers, or the application time of the erase voltage Vers may be determined in various forms under the control of the controller.

Figure 9:
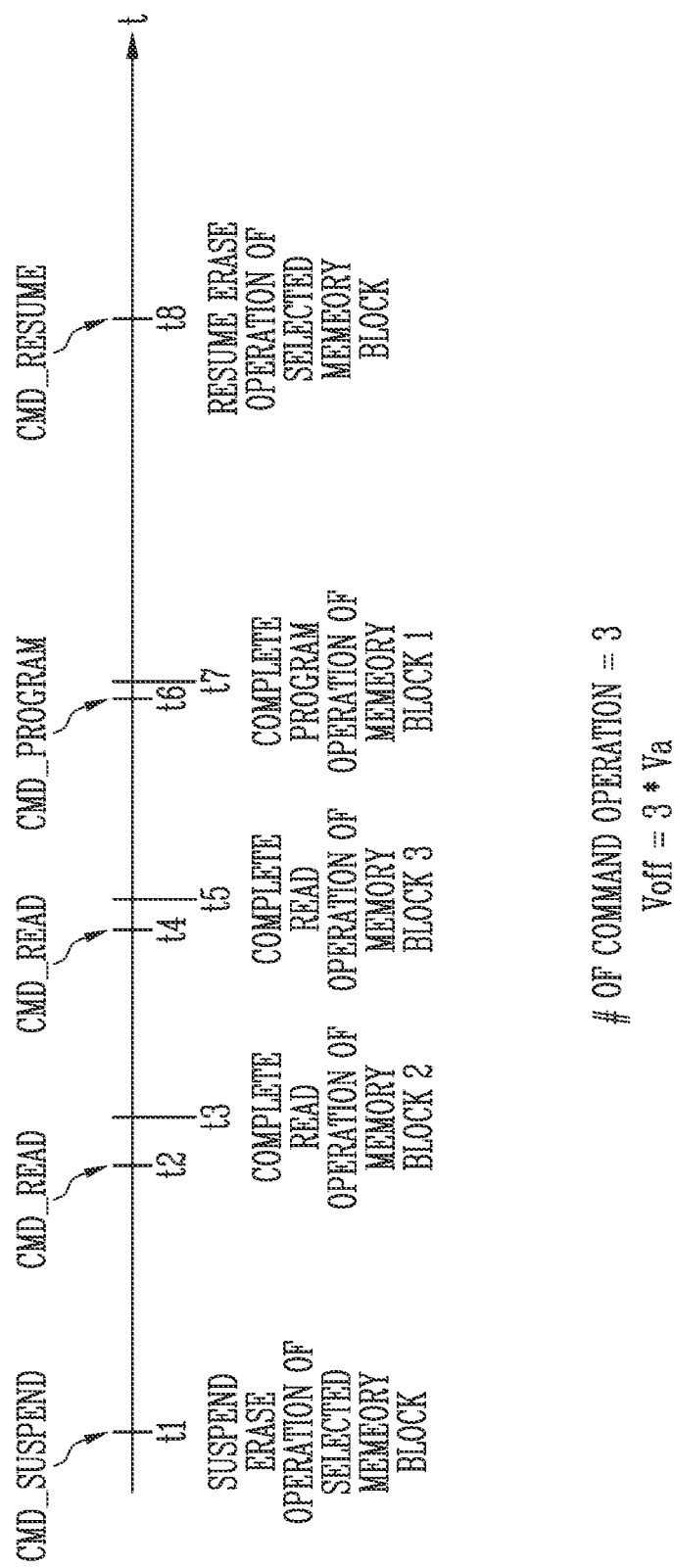
FIG. 9 is a diagram illustrating an embodiment in which an erase operation is suspended according to an embodiment of the present disclosure.

FIG. 9 is a diagram illustrating an embodiment in which an erase operation is suspended according to an embodiment of the present disclosure.

Referring to FIG. 9, the horizontal axis indicates time t.

The operation counter circuit illustrated in FIG. 2 may count the number of command operations completed while the erase verify operation stays suspended. The command operation may include a program operation, a read operation, or an erase operation performed on memory blocks other than a selected memory block.

The memory device may be operated in response to a command provided from the controller. The memory device may suspend an operation being performed in response to a suspend command CMD_SUSPEND provided from the controller.

In an embodiment, the memory device may suspend an erase operation being performed in response to a suspend command that is input while the erase operation is performed on the selected memory block (at a time point t1).

At a time point t2, a read command CMD_READ for a second memory block may be input. The memory device may perform a read operation on the second memory block in response to the read command CMD_READ. When the read operation on the second memory block is completed, the memory device may provide a completion response command to the controller. The operation counter circuit may increase the number when the read operation on the second memory block is completed (at a time point t3). At the time point t3, the number stored in the operation counter circuit may be 1.

Because a resume command CMD_RESUME for the suspended erase operation is not yet input, the memory device may not perform the suspended erase operation.

At a time point t4, a read command CMD_READ for a third memory block may be input. The memory device may perform a read operation on the third memory block in response to the read command CMD_READ. When the read operation on the third memory block is completed, the memory device may provide a completion response command to the controller. The operation counter circuit may increase the number when the read operation on the third memory block is completed (at a time point t5). At the time point t5, the number stored in the operation counter circuit may be 2.

Because a resume command CMD_RESUME for the suspended erase operation is not yet input, the memory device may not perform the suspended erase operation.

At a time point t6, a program command CMD_PROGRAM for the first memory block may be input. The memory device may store data in the first memory block in response to the program command CMD_PROGRAM. When the program operation on the first memory block is completed, the memory device may provide a completion response command to the controller. The operation counter circuit may increase the number when the program operation on the first memory block is completed (at a time point t7). At the time point t7, the number stored in the operation counter circuit may be 3.

Because a resume command CMD_RESUME for the suspended erase operation is not yet input, the memory device may not perform the suspended erase operation.

At a time point t8, the resume command CMD_RESUME for the suspended erase operation may be input. The memory device may resume the suspended erase operation at the time point t8.

In an embodiment, the erase verify voltage determiner illustrated in FIG. 2 may determine an erase verify voltage based on the counted number stored in the operation counter circuit. The erase verify voltage determiner may determine the offset voltage Voff based on the counted number stored in the operation counter circuit. The erase verify voltage determiner may determine the offset voltage Voff by multiplying the counted number by the reference offset voltage Va illustrated in FIG. 4. As illustrated in FIG. 9, the number of the command operations completed during the period from t1 to t8 in which the erase operation is suspended is 3, and thus the offset voltage Voff may be a value obtained by multiplying 3 by the reference offset voltage Va.

Figure 10:
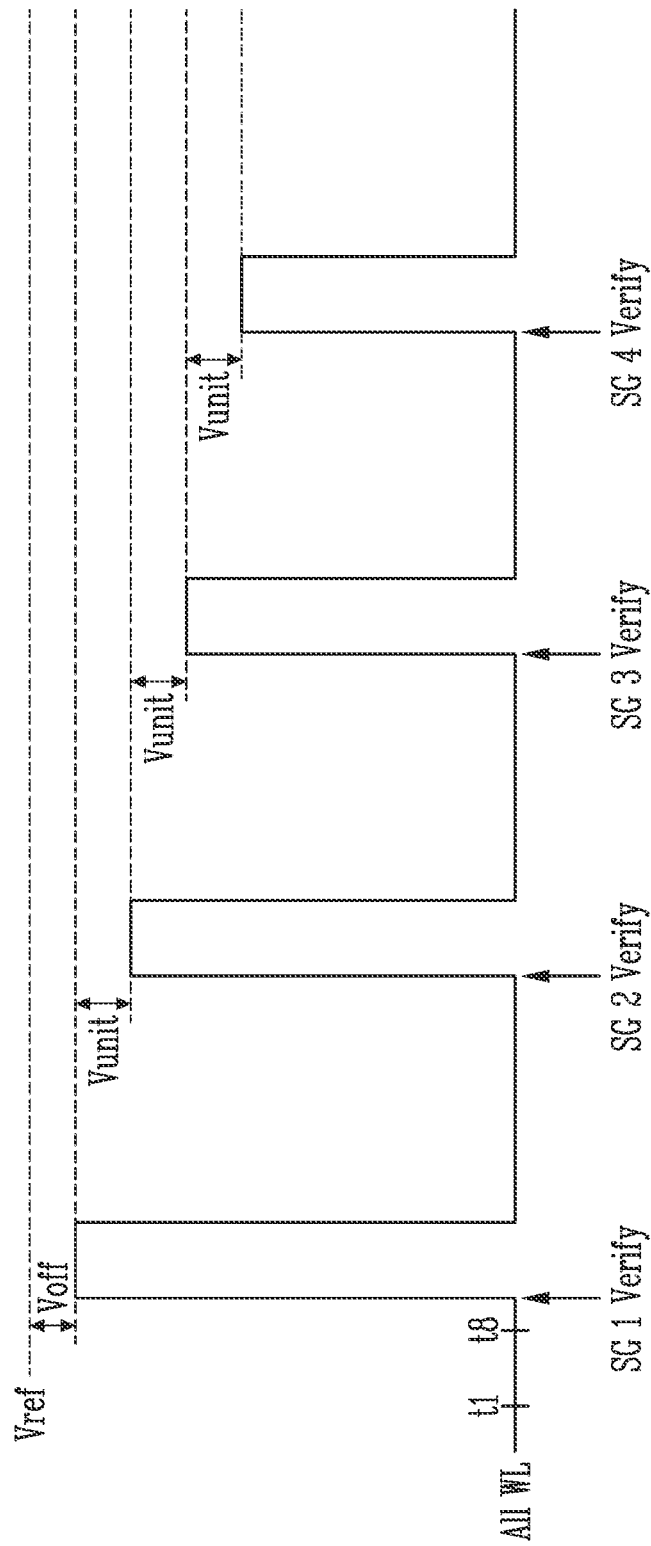
FIG. 10 is a diagram illustrating different erase verify voltages that are applied according to an embodiment of the present disclosure.

FIG. 10 is a diagram illustrating different erase verify voltages that are applied according to an embodiment of the present disclosure.

Referring to FIG. 10, the erase verify voltage determiner may determine the erase verify voltages in further consideration of the offset voltage Voff illustrated in FIG. 9.

As described above with reference to FIG. 9, the offset voltage Voff which is determined based on the number of the command operations completed during the period from t1 to t8 in which the erase operation is suspended, is a value obtained by multiplying 3 by the reference offset voltage Va.

The erase verify voltage applied to the selected memory block while the erase verify operation is performed on each cell string group may be decreased by a unit voltage Vunit.

The erase verify voltage, applied when the erase verify operation is performed on a first cell string group SG1 on which the erase verify operation is first performed, may be a voltage Vref-Voff obtained by subtracting the offset voltage Voff from the reference erase verify voltage Vref.

The erase verify voltage determiner may determine the erase verify voltage to be applied when the erase verify operation is performed on a second cell string group SG2 that is a cell string group next to the first cell string group SG1. In an embodiment, the erase verify voltage for the second cell string group SG2 may be a voltage Vref-Vunit-Voff decreased from the voltage Vref-Voff, obtained by subtracting the offset voltage Voff from the reference erase verify voltage Vref, by a unit voltage Vunit.

The erase verify voltage determiner may determine the erase verify voltage to be applied when the erase verify operation is performed on a third cell string group SG3 that is a cell string group next to the second cell string group SG2. In an embodiment, the erase verify voltage for the third cell string group SG3 may be a voltage Vref−2*Vunit-Voff decreased from the erase verify voltage Vref-Vunit-Voff for the second cell string group SG2 by the unit voltage Vunit.

The erase verify voltage determiner may determine the erase verify voltage to be applied when the erase verify operation is performed on a fourth cell string group SG4 that is a cell string group next to the third cell string group SG3. In an embodiment, the erase verify voltage for the fourth cell string group SG4 may be a voltage Vref−3*Vunit-Voff decreased from the erase verify voltage Vref−2*Vunit-Voff for the third cell string group SG3 by the unit voltage Vunit.

The erase verify voltage determiner may generate an erase verify voltage table.

In an embodiment, the erase verify voltage determiner may generate, as a lookup table, erase verify voltages to be applied to the selected memory block based on the information required to determine the erase verify voltages, the information being stored in the erase verify voltage information storage 1311. However, the present disclosure is not limited to this embodiment, and erase verify voltages to be applied to respective cell string groups may be stored in advance in the format of the lookup table.

FIG. 11 is a flowchart illustrating the operation of a memory device according to an embodiment of the present disclosure.

For convenience of description, the memory device is performing an erase operation on the selected memory block.

The memory device may suspend, in response to an erase suspend command provided from the controller, the erase operation being performed on a selected memory block at operation S1101. The suspended erase operation may not be performed until the controller provides a resume command.

The memory device may perform a command operation on memory blocks other than the selected memory block. The command operation may include a program operation, a read operation, or an erase operation performed on the memory blocks other than the selected memory block. At operation S1103, the memory device may count the number of command operations completed on the memory blocks other than the selected memory block during a period from a time at which the erase suspend command is input to a time at which an erase resume command is input.

The memory device may determine an erase verify voltage based on the counted number at operation S1105. The memory device may determine the erase verify voltage based on the reference erase verify voltage Vref, the unit voltage Vunit, and the offset voltage Voff, as described above with reference to FIG. 10.

In an embodiment, the memory device may determine the offset voltage Voff by multiplying the reference offset voltage Va by the number of the completed command operations. The memory device may determine the erase verify voltage so that the erase verify voltage is decreased by the unit voltage whenever the erase verify operation is performed on each of the cell string groups.

In an embodiment, the memory device may determine the erase verify voltage to be applied in the erase verify operation on each cell string group so that the erase verify operation is performed in units of the cell string groups within the selected memory block. The erase verify voltage to be applied in the erase verify operation on each cell string group may be decreased by the unit voltage.

In an embodiment, the memory device may determine the erase verify voltage so that a voltage decreased by the offset voltage Voff is applied in each erase verify operation and may generate erase verify voltages to be applied in erase verify operations on respective cell string groups in the form of a lookup table.

The memory device may resume the suspended erase operation in response to an erase resume command provided from the controller at operation S1107. The erase operation may include an erase voltage application operation and an erase verify operation required for decreasing the threshold voltages of memory cells included in the selected memory block to an erase state.

The memory device may perform the erase verify operation, as a sub operation of the erase operation, on the basis of each cell string group included in the selected memory block at operation S1109. Each cell string group may include one or more cell strings. That is, the memory device may perform the erase verify operation on each of one or more cell strings.

The memory device according to the present disclosure may perform an erase verify operation in units of the cell string groups within the selected memory block.

In the embodiments described above, all of the steps may optionally be performed or omitted. In addition, the steps in each embodiment need not occur in order, and may be reversed. Meanwhile, the embodiments of the present disclosure disclosed in the present specification and the drawings are merely specific examples for easily describing the technical content of the present specification and facilitating understanding of the present specification and do not limit the scope of the present specification. That is, it is apparent to those skilled in the art to which the present disclosure pertains that other modification examples based on the technical spirit of the present disclosure are possible.

Moreover, the present specification and drawings disclose various embodiments of the present disclosure. Although specific terms are used, the terms are used in general meaning for purposes of easily describing technical content of the present disclosure and facilitating understanding of the present disclosure, and are not intended to limit the scope of the present disclosure. It is apparent to those skilled in the art to which the present disclosure pertains that other modification examples based on the technical spirit of the present disclosure may be carried out in addition to the embodiments disclosed herein and the following claims. Furthermore, the embodiments may be combined to form additional embodiments.

What is claimed is:

1. A memory device, comprising:
   a plurality of memory blocks each including a plurality of cell string groups;
   a peripheral circuit configured to perform an erase verify operation on a memory block selected from among the plurality of memory blocks; and
   an erase operation controller configured to control the peripheral circuit to perform the erase verify operation in units of cell string groups within the selected memory block,
   wherein the erase operation controller controls the peripheral circuit to apply, during the erase verify operation, different erase verify voltages to the selected memory block whenever the erase verify operation is performed on each of the cell string groups.

2. The memory device according to claim 1, wherein the erase operation controller comprises:
   an erase verify voltage information storage configured to store information for the different erase verify voltages to be applied to a plurality of word lines coupled to the selected memory block; and
   an erase verify voltage determiner configured to determine the different erase verify voltages based on the information for the different erase verify voltages.

3. The memory device according to claim 2, wherein the information for the different erase verify voltages includes information about a reference erase verify voltage and a preset unit voltage, the reference erase verify voltage to be applied to word lines coupled to a cell string group, on which the erase verify operation is first performed among the cell string groups.

4. The memory device according to claim 3, wherein the erase verify voltage determiner is further configured to generate an erase verify voltage table which stores the different erase verify voltages such that each of the different erase verify voltage which is decreased from the reference erase verify voltage by an integer multiple of the unit voltage, is applied to the plurality of word lines whenever the erase verify operation is performed on each cell string group.

5. The memory device according to claim 3, wherein the erase verify voltage determiner is further configured to generate an erase verify voltage table which stores the different erase verify voltages such that each of the different erase verify voltage which is increased from the reference erase verify voltage by an integer multiple of the unit voltage, is applied to the plurality of word lines whenever the erase verify operation is performed on the each cell string group.

6. The memory device according to claim 3, wherein the erase verify voltage determiner is further configured to generate an erase verify voltage table which stores the different erase verify voltages such that each of the different erase verify voltage which is decreased from the reference erase verify voltage by N times the unit voltage, is applied to the plurality of word lines whenever the erase verify operation is performed N times respectively on N cell string groups, where N is a natural number.

7. The memory device according to claim 2,
wherein the erase verify voltage determiner is further configured to generate an erase verify voltage table;
wherein the erase verify voltage table stores the different erase verify voltages which are applied to the plurality of word lines whenever the erase verify operation is performed; and
wherein the erase operation controller controls the peripheral circuit to apply the different erase verify voltages based on the erase verify voltage table.

8. The memory device according to claim 1, wherein the erase operation controller controls the peripheral circuit to perform the erase verify operation on all of the cell string groups within the selected memory block.

9. The memory device according to claim 3, wherein the erase operation controller further comprises an operation counter circuit configured to count a number of command operations completed during a period from a time at which an erase suspend command provided from a controller is input to a time at which an erase resume command provided from the controller is input.

10. The memory device according to claim 9, wherein the command operation includes a read operation, a program operation or an erase operation on memory blocks other than the selected memory block among the plurality of memory blocks.

11. The memory device according to claim 10, wherein:
the erase verify voltage information storage further includes information about a reference offset voltage, and
the erase verify voltage determiner is further configured to generate an erase verify voltage table based on the reference erase verify voltage, the unit voltage, and the reference offset voltage,
wherein the erase verify voltage table stores the different erase verify voltages are applied to the plurality of word lines whenever the erase verify operation is performed.

12. The memory device according to claim 11,
wherein the erase verify voltage determiner generates the erase verify voltage table such that voltages, obtained by subtracting an offset voltage from the different erase verify voltages, are applied to the plurality of word lines whenever the erase verify operation is performed on each cell string group,
wherein the offset voltage is determined based on the number of command operations completed during the period, and
wherein the different erase verify voltages are decreased from the reference erase verify voltage by an integer multiple of the unit voltage.

13. A method of operating a memory device, the method comprising:
suspending, in response to an erase suspend command, an erase operation being performed on a selected memory block;
counting a number of command operations completed during a period from a time at which the erase suspend command is input to a time at which an erase resume command is input;
determining an erase verify voltage to be applied to the selected memory block based on the counted number; and
resuming the suspended erase operation in response to the erase resume command.

14. The method according to claim 13, wherein the command operation includes a program operation, a read operation or an erase operation on memory blocks other than the selected memory block.

15. The method according to claim 13, wherein the determining the erase verify voltage comprises:
determining an offset voltage proportional to the number of command operations; and
generating a table of erase verify voltages to be applied to a plurality of word lines included in the selected memory block based on a reference erase verify voltage, a preset unit voltage, and the offset voltage.

16. The method according to claim 13, further comprising performing, based on the erase verify voltage, an erase verify operation which is a sub operation of the erase operation in units of cell string groups included in the selected memory block.

17. The method according to claim 16, wherein the erase verify operation is performed on all of the cell string groups.

18. An operating method of a memory device, the operating method comprising suspending and then resuming an erase operation on a first memory block,
wherein the resumed erase operation includes an operation of applying an erase verify voltage to each cell string group of a plurality of cell string groups, the erase verify voltage depending on a number of operations completed on one or more second memory blocks while the erase operation stays suspended.

* * * * *